US012659973B2

(12) United States Patent
Yu et al.

(10) Patent No.: US 12,659,973 B2
(45) Date of Patent: Jun. 16, 2026

(54) METHODS AND APPARATUSES FOR TRANSMITTING A SIDELINK POSITIONING REFERENCE SIGNAL

(71) Applicant: LENOVO (BEIJING) LIMITED, Beijing (CN)

(72) Inventors: Xiaodong Yu, Beijing (CN); Haipeng Lei, Beijing (CN); Bingchao Liu, Beijing (CN); Zhennian Sun, Beijing (CN); Xin Guo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 372 days.

(21) Appl. No.: 18/264,372

(22) PCT Filed: Feb. 8, 2021

(86) PCT No.: PCT/CN2021/076002
§ 371 (c)(1),
(2) Date: Aug. 4, 2023

(87) PCT Pub. No.: WO2022/165835
PCT Pub. Date: Aug. 11, 2022

(65) Prior Publication Data
US 2024/0098757 A1      Mar. 21, 2024

(51) Int. Cl.
*H04W 72/25*      (2023.01)
*H04L 5/00*      (2006.01)

(52) U.S. Cl.
CPC .......... *H04W 72/25* (2023.01); *H04L 5/0053* (2013.01); *H04L 5/0094* (2013.01)

(58) Field of Classification Search
CPC ..... H04W 72/25; H04L 5/0053; H04L 5/0094
See application file for complete search history.

(56) References Cited

U.S. PATENT DOCUMENTS

2020/0344722 A1    10/2020  He et al.
2021/0297206 A1*   9/2021   Manolakos ....... H04W 72/0446
(Continued)

FOREIGN PATENT DOCUMENTS

CN        109196925 A      1/2019
CN        111093154 A      5/2020
(Continued)

OTHER PUBLICATIONS

Qualcomm Incorporated. "On unlicensed positioning and applicable use cases" 3GPP RAN#86, RP-192527, pp. 1-12, Dec. 12, 2019.
(Continued)

*Primary Examiner* — Brenda H Pham
(74) *Attorney, Agent, or Firm* — AMPACC Law Group, PLLC

(57) ABSTRACT

Embodiments of the present disclosure relate to methods and apparatuses for a sidelink positioning mechanism in 3GPP (3rd Generation Partnership Project) 5G and/or new radio (NR) networks. According to an embodiment of the present disclosure, a method performed by a user equipment (UE) includes: receiving at least one of positioning reference signal (PRS) configuration information and downlink control information (DCI); generating sidelink control information (SCI) based on the at least one of the PRS configuration information and the DCI, wherein the SCI indicates a resource in time and frequency domains for a sidelink-positioning reference signal (SL-PRS); and transmitting the SCI.

21 Claims, 10 Drawing Sheets

(56)                    References Cited

U.S. PATENT DOCUMENTS

| 2022/0229146 A1 | 7/2022 | Ko et al. | |
| 2022/0361142 A1 | 11/2022 | Ko et al. | |
| 2023/0296752 A1* | 9/2023 | Thomas | H04L 5/0048 |
| | | | 342/125 |
| 2024/0214966 A1* | 6/2024 | Ko | H04L 5/0048 |

FOREIGN PATENT DOCUMENTS

| CN | 112203223 A | 1/2021 |
| WO | 2020033088 A1 | 2/2020 |
| WO | 2020198616 A1 | 10/2020 |
| WO | 2020251318 A1 | 12/2020 |
| WO | 2020256311 A1 | 12/2020 |

OTHER PUBLICATIONS

International Search Report and Written Opinion dated Nov. 5, 2021
for International Application No. PCT/CN2021/076002.
European Search Report and Written Opinion dated Nov. 14, 2024
for European Patent Application No. 21923845.8.

* cited by examiner

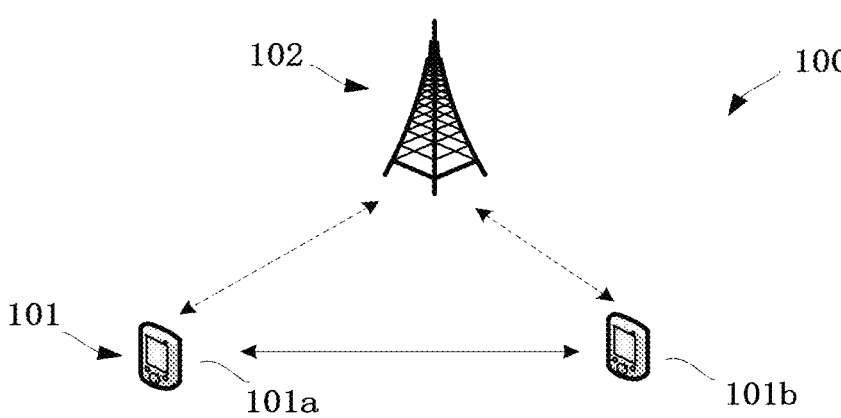

FIG. 1

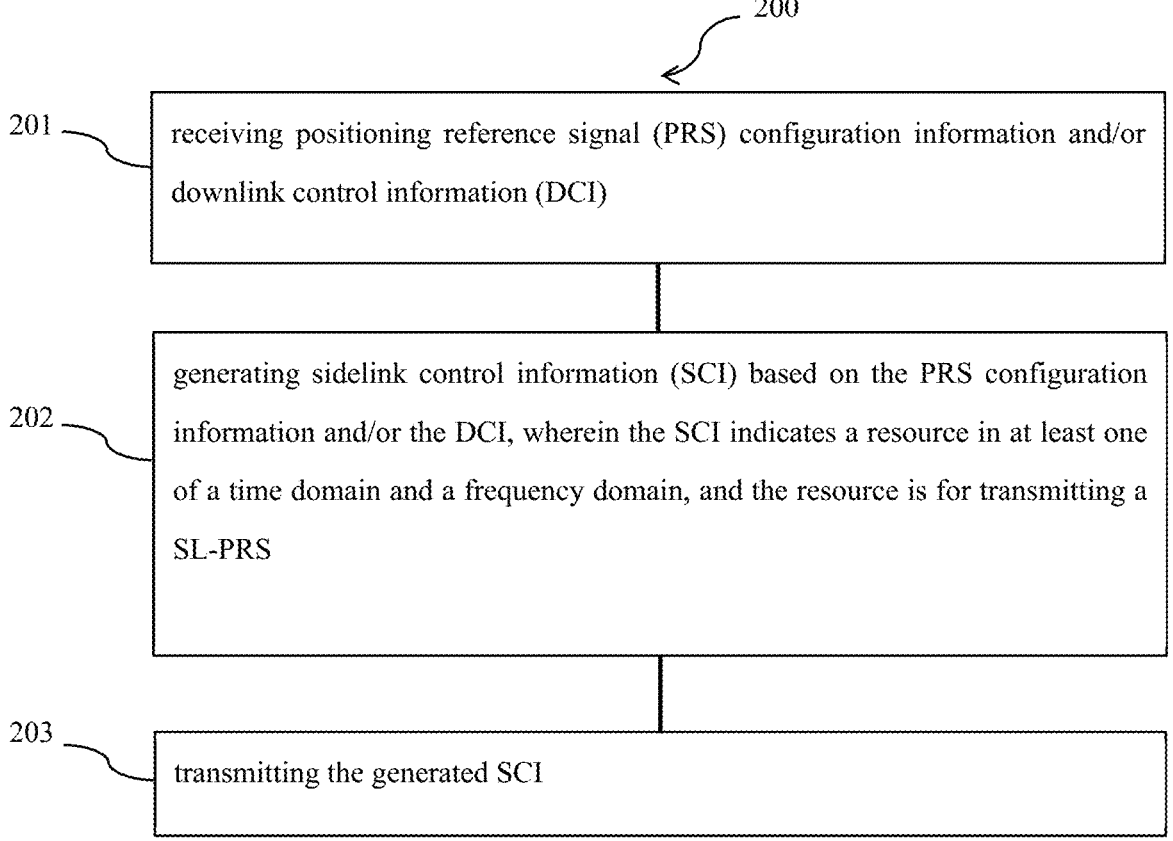

201 — receiving positioning reference signal (PRS) configuration information and/or downlink control information (DCI)

202 — generating sidelink control information (SCI) based on the PRS configuration information and/or the DCI, wherein the SCI indicates a resource in at least one of a time domain and a frequency domain, and the resource is for transmitting a SL-PRS 203 — transmitting the generated SCI

FIG. 2

| | total number of SL-PRS symbols = 6 | total number of SL-PRS symbols = 7 | total number of SL-PRS symbols = 9 | total number of SL-PRS symbols = 10 |
|---|---|---|---|---|
| comb value = 2 | SL-PRS RE offset set = {0, 1, 0, 1, 0, 1}, K0 = 0, l_offset symbol = 4 <br><br> Pattern index = 0 | SL-PRS RE offset set = {0, 1, 0, 1, 0, 1, 0}, K0 = 0, l_offset symbol = 3 <br><br> Pattern index = 1 | SL-PRS RE offset set = {0, 1, 0, 1, 0, 1, 0, 1, 0}, K0 = 0, l_offset symbol = 4 <br><br> Pattern index = 2 | SL-PRS RE offset set = {0, 1, 0, 1, 0, 1, 0, 1, 0, 1}, K0 = 0, l_offset symbol = 3 <br><br> Pattern index = 3 |
| comb value = 4 | SL-PRS RE offset set = {0, 2, 1, 3, 0, 2}, K0 = 0, l_offset symbol = 4 <br><br> Pattern index = 4 | SL-PRS RE offset set = {0, 2, 1, 3, 0, 2, 1}, K0 = 0, l_offset symbol = 3 <br><br> Pattern index = 5 | SL-PRS RE offset set = {0, 2, 1, 3, 0, 2, 1, 3, 0}, K0 = 0, l_offset symbol = 4 <br><br> Pattern index = 6 | SL-PRS RE offset set = {0, 2, 1, 3, 0, 2, 1, 3, 0, 2}, K0 = 0, l_offset symbol = 3 <br><br> Pattern index = 7 |
| comb value = 8 | SL-PRS RE offset set = {0, 4, 2, 6, 1, 5}, K0 = 0, l_offset symbol = 4 <br><br> Pattern index = 8 | SL-PRS RE offset set = {0, 4, 2, 6, 1, 5, 3}, K0 = 0, l_offset symbol = 3 <br><br> Pattern index = 9 | SL-PRS RE offset set = {0, 4, 2, 6, 1, 5, 3, 7, 0}, K0 = 0, l_offset symbol = 4 <br><br> Pattern index = 10 | SL-PRS RE offset set = {0, 4, 2, 6, 1, 5, 3, 7, 0, 4}, K0 = 0, l_offset symbol = 3 <br><br> Pattern index = 11 |

FIG. 4 total number of SL-PRS symbols = 9, comb value = 4,
SL-PRS RE offset set = {0, 2, 1, 3, 0, 2, 1, 3, 0},
K0 = 0, I_offset symbol= 4

UE-1 PRS pattern total number of SL-PRS symbols = 9, comb value = 4,
SL-PRS RE offset set= {0, 2, 1, 3, 0, 2, 1, 3, 0},
K0 = 1, I_offset symbol= 4

UE-2 PRS pattern total number of SL-PRS symbols = 9, comb value = 4,
SL-PRS RE offset set = {0, 2, 1, 3, 0, 2, 1, 3, 0},
K0 = 2, l_offset symbol= 4

UE-3 PRS pattern total number of SL-PRS symbols = 9, comb value = 4,
SL-PRS RE offset set = {0, 2, 1, 3, 0, 2, 1, 3, 0},
K0 = 3, l_offset symbol= 4

UE-4 PRS pattern

| Total number of sub-channel(s) for a SL-PRS | Comb value | Total number of PSCCH transmission(s) or Total number of PSCCH+PSSCH transmission(s) |
|---|---|---|
| 2 | 2 | 1 |
|   | 4 | N/A |
|   | 8 | N/A |
| 4 | 2 | 2 |
|   | 4 | 1 |
|   | 8 | N/A |
| 6 | 2 | 3 |
|   | 4 | N/A |
|   | 8 | N/A |
| 8 | 2 | 4 |
|   | 4 | 2 |
|   | 8 | 1 |
| 10 | 2 | 5 |
|   | 4 | N/A |
|   | 8 | N/A |

METHODS AND APPARATUSES FOR TRANSMITTING A SIDELINK POSITIONING REFERENCE SIGNAL

CROSS REFERENCE TO RELATED APPLICATIONS

This application is a national phase entry of International Application No. PCT/CN2021/076002 filed Feb. 8, 2021, which is incorporated by reference in its entirety.

TECHNICAL FIELD

Embodiments of the present application are related to wireless communication technology, and more particularly, related to methods and apparatuses for transmitting a sidelink positioning reference signal in 3GPP (3rd Generation Partnership Project) 5G and/or new radio (NR) networks.

BACKGROUND

Vehicle to everything (V2X) has been introduced into 3GPP 5G wireless communication technology. In terms of a channel structure of V2X communication, a direct link between two UEs is called a sidelink. A sidelink is a long-term evolution (LTE) feature introduced in 3GPP Release 12, and enables a direct communication between proximal UEs, and data does not need to go through a base station (BS) or a core network.

3GPP 5G and/or new radio (NR) networks are expected to increase network throughput, coverage, and robustness and reduce latency and power consumption. With the development of 3GPP 5G and/or NR networks, various aspects need to be studied and developed to perfect the 5G and/or NR technology. Currently, details regarding how to transmit a sidelink positioning reference signal have not been discussed in 3GPP 5G and/or NR technology yet.

SUMMARY

Some embodiments of the present application provide a method, which may be performed by a user equipment (UE). The method includes: receiving at least one of positioning reference signal (PRS) configuration information and downlink control information (DCI); generating sidelink control information (SCI) based on the at least one of the PRS configuration information and the DCI, wherein the SCI indicates a resource in at least one of a time domain and a frequency domain, and wherein the resource is for transmitting a sidelink-positioning reference signal (SL-PRS); and transmitting the SCI.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement any of the abovementioned methods performed by a UE.

Some embodiments of the present application provide a further method, which may be performed by a base station (BS). The method includes: transmitting at least one of positioning reference signal (PRS) configuration information and downlink control information (DCI); and receiving information associated with a relative geographical position between two or more user equipments (UEs).

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement any of the abovementioned methods performed by a BS.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore intended to limit the scope of the present application.

FIG. 1 illustrates an exemplary V2X communication system according to some embodiments of the present application;

FIG. 2 illustrates an exemplary flow chart of a method for receiving information associated with a SL-PRS according to some embodiments of the present application;

FIG. 4 illustrates an exemplary flow chart of SL-PRS configuration information according to some embodiments of the present application;

DETAILED DESCRIPTION

Figure 3:
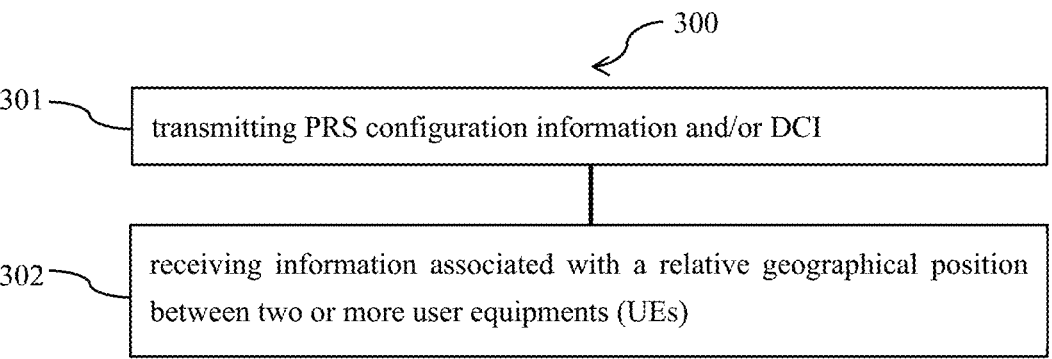
FIG. 3 illustrates an exemplary flow chart of a method for transmitting information associated with a SL-PRS according to some embodiments of the present application.

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8, B5G, 6G, and so on. It is contemplated that along with developments of network architectures and new service scenarios, all embodiments in the present application are also applicable to similar technical problems; and moreover, the terminologies recited in the present application may change, which should not affect the principle of the present application.

In a V2X communication system, a transmission UE may also be named as a transmitting UE, a Tx UE, a sidelink Tx UE, a sidelink transmission UE, or the like. A reception UE may also be named as a receiving UE, a Rx UE, a sidelink Rx UE, a sidelink reception UE, or the like.

FIG. 1 illustrates an exemplary V2X communication system according to some embodiments of the present application.

As shown in FIG. 1, a wireless communication system 100 includes at least one user equipment (UE) 101 and at least one base station (BS) 102. In particular, the wireless communication system 100 includes two UEs 101 (e.g., UE 101*a* and UE 101*b*) and one BS 102 for illustrative purpose. Although a specific number of UEs 101 and BS 102 are depicted in FIG. 1, it is contemplated that any number of UEs 101 and BSs 102 may be included in the wireless communication system 100.

UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle onboard computers, network devices (e.g., routers, switches, and modems), or the like. According to some embodiments of the present application, UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, a UE is a pedestrian UE (P-UE or PUE) or a cyclist UE. In some embodiments of the present application, UE(s) 101 includes wearable devices, such as smart watches, fitness bands, optical head-mounted displays, or the like. Moreover, UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. UE(s) 101 may communicate directly with BS(s) 102 via LTE or NR Uu interface.

In some embodiments of the present application, each of UE(s) 101 may be deployed an IoT application, an eMBB application and/or a URLLC application. For instance, UE 101*a* may implement an IoT application and may be named as an IoT UE, while UE 101*b* may implement an eMBB application and/or a URLLC application and may be named as an eMBB UE, an URLLC UE, or an eMBB/URLLC UE.

It is contemplated that the specific type of application(s) deployed in UE(s) 101 may be varied and not limited.

In a V2X communication system, a transmission UE may also be named as a transmitting UE, a Tx UE, a sidelink Tx UE, a sidelink transmission UE, or the like. A reception UE may also be named as a receiving UE, a Rx UE, a sidelink Rx UE, a sidelink reception UE, or the like.

According to some embodiments of FIG. 1, UE 101*a* functions as a Tx UE, and UE 101*b* functions as a Rx UE. UE 101*a* may exchange V2X messages with UE 101*b* through a sidelink, for example, PC5 interface as defined in 3GPP standard document TS23.303. UE 101*a* may transmit information or data to other UE(s) within the V2X communication system, through sidelink unicast, sidelink groupcast, or sidelink broadcast. For instance, UE 101*a* transmits data to UE 101*b* in a sidelink unicast session. UE 101*a* may transmit data to UE 101*b* and other UEs in a groupcast group (not shown in FIG. 1) by a sidelink groupcast transmission session. Also, UE 101*a* may transmit data to UE 101*b* and other UEs (not shown in FIG. 1) by a sidelink broadcast transmission session.

Alternatively, according to some other embodiments of FIG. 1, UE 101*b* functions as a Tx UE and transmits V2X messages, and UE 101*a* functions as a Rx UE and receives the V2X messages from UE 101*b*.

Both UE 101*a* and UE 101*b* in the embodiments of FIG. 1 may transmit information to BS(s) 102 and receive control information from BS(s) 102, for example, via LTE or NR Uu interface. BS(s) 102 may be distributed over a geographic region. In certain embodiments of the present application, each of BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the downlink (DL) and UE(s) 101 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present application, BS(s) 102 may communicate using other communication protocols, such as the IEEE 802.11 family of wireless communication protocols. Further, in some embodiments of the present application, BS(s) 102 may communicate over licensed spectrums, whereas in other embodiments, BS(s)

102 may communicate over unlicensed spectrums. The present application is not intended to be limited to the implementation of any particular wireless communication system architecture or protocol. In yet some embodiments of present application, BS(s) 102 may communicate with UE(s) 101 using the 3GPP 5G protocols.

UE(s) 101 may access BS(s) 102 to receive data packets from BS(s) 102 via a downlink channel and/or transmit data packets to BS(s) 102 via an uplink channel. In normal operation, since UE(s) 101 does not know when BS(s) 102 will transmit data packets to it, UE(s) 101 has to be awake all the time to monitor the downlink channel (e.g., a Physical Downlink Control Channel (PDCCH)) to get ready for receiving data packets from BS(s) 102. However, if UE(s) 101 keeps monitoring the downlink channel all the time even when there is no traffic between BS(s) 102 and UE(s) 101, it would result in significant power waste, which is problematic to a power limited or power sensitive UE.

In general, two sidelink resource allocation modes are supported, i.e., Mode 1 and Mode 2. In Mode 1, a sidelink resource in time and frequency domains allocation is provided by a network or a BS. In Mode 2, a UE decides sidelink transmission resource(s) in time and frequency domains in a resource pool.

According to agreements of 3GPP standard documents, in a 3GPP 5G NR sidelink system or the like, in a sidelink positioning scenario, a sidelink-positioning reference signal (SL-PRS) may be always transmitted from a road side unit (RSU), and the SL-PRS may be transmitted from a UE based on a trigger condition. SL-PRS configuration, downlink control information (DCI) scheduling-based SL-PRS transmission, a scheduling request (SR) for the SL-PRS may be transmitted for a UE in Mode 1. SL-PRS configuration, competition-based SL-PRS transmission, and sensing may be transmitted for a UE in Mode 2. Currently, issues regarding how to design a SL-PRS pattern and how to reuse a Uu positioning mechanism have not been solved, and relevant details have not been discussed in 3GPP 5G and/or NR technology yet. Embodiments of the present application aim to solve the above issues and provide a SL-PRS transmission mechanism.

In particular, a benefit of a SL-PRS transmission mechanism is that the SL-PRS can be particularly useful for relative positioning in a V2X service, which is inherently based on positioning. For relative positioning of a sidelink, a particular Tx UE may transmit a SL-PRS, while a Rx UE can measure time information. With the time information measured by the Rx UE and the Rx UE's geographical orientation information, the Tx UE and/or the Rx UE can get a detailed relative geographical position between the Tx UE and the Rx UE including a relative distance and a relative direction. The relative geographical position between the Tx UE and the Rx UE may be transmitted to a BS.

Some embodiments of the present application provide specific alternatives for SL-PRS configuration solutions between a BS and a sidelink UE. Some embodiments of the present application provide specific alternatives for SL-PRS transmission solutions between two or more sidelink UEs. Some embodiments of the present application provide specific alternatives for avoiding an automatic gain control (AGC) issue. For example, some embodiments of the present application provide a solution of transmitting a physical sidelink control channel (PSCCH) transmission and a repetition of the PSCCH transmission. Some other embodiments of the present application provide a solution of transmitting a PSCCH transmission and a physical sidelink shared channel (PSSCH) transmission. Moreover, the embodiments of the present application have an advantage of reducing a signaling overhead in a network during positioning a sidelink UE. More details will be illustrated in the following text in combination with the appended drawings.

FIG. 2 illustrates an exemplary flow chart of a method for receiving information associated with a SL-PRS according to some embodiments of the present application. The embodiments of FIG. 2 may be performed by a UE or a Tx UE (e.g., UE 101*a* or UE 101*b* illustrated and shown in FIG. 1). Although described with respect to a UE, it should be understood that other devices may be configured to perform a method similar to that of FIG. 2.

In the exemplary method 200 as shown in FIG. 2, in operation 201, a UE (e.g., UE 101*a* illustrated and shown in FIG. 1) receives positioning reference signal (PRS) configuration information and/or downlink control information (DCI). In operation 202, the UE generates SCI based on the PRS configuration information and/or the DCI. The SCI indicates a resource in time and/or frequency domains. The resource is for transmitting a SL-PRS. In operation 203, the UE transmits the generated SCI.

According to some embodiments, the UE further transmits the SL-PRS on the resource in the time and/or frequency domains for the SL-PRS. For instance, the resource in the time and/or frequency domains for the SL-PRS is in a sidelink resource pool in the time and frequency domains.

In an embodiment, a SL-PRS is transmitted in a sub-set of time and/or frequency resources in a sidelink resource pool. For instance, configuration information may be configured to the UE to indicate available resource(s) in time and/or frequency domains. Such configuration information may include sub-channel index(es), resource block (RB) index(es), and/or timeslot index(es). In an embodiment, the DCI received in operation 201 or the SCI transmitted in operation 203 may be used to indicate a time and/or frequency resource on which a SL-PRS is transmitted.

According to some embodiments, the PRS configuration information received in operation 201 includes information relating to available resource(s) in a resource pool. The information relating to the available resource(s) may include at least one of:

(1) a sub-channel index value regarding each resource of the available resource(s) in the resource pool;

(2) a sub-channel index indication in a bitmap manner regarding each resource of the available resource(s) and non-available resource(s) in the resource pool;

(3) a resource block (RB) index value regarding each resource of the available resource(s) in the resource pool;

(4) a RB index indication in a bitmap manner regarding each resource of the available resource(s) and non-available resource(s) in the resource pool;

(5) a timeslot index value regarding each resource of the available resource(s) in the resource pool; and (6) a timeslot index indication in a bitmap manner regarding each resource of the available resource(s) and non-available resources(s) in the resource pool.

According to some embodiments, at least one of the PRS configuration information, the DCI, and the SCI may include one or more fields. The one or more fields are associated with the SL-PRS. In an embodiment, the SCI include one or more fields, and the one or more fields within the SCI are carried in a first stage of the SCI and/or a second stage of the SCI.

In a further embodiment, at least one of the PRS configuration information, the DCI, and the SCI includes at least one of following Fields (1)-(6):

Field (1): a pattern index value of a PRS pattern of the SL-PRS. Field (1) may be marked as "SL-PRS pattern index" or the like. Specific examples of PRS patterns are described in FIGS. 5A-5D.

A UE can determine a PRS pattern based on the PRS configuration information and/or the DCI. For example, if a higher layer configures 8 SL-PRS configurations, Field (1) can include 3 bits to represent 8 SL-PRS configurations.

Field (2): a comb value of the PRS pattern of the SL-PRS. For example, Field (2) can include 2 bits to represent 4 comb values, i.e., "00" represents comb=2; "01" represents comb=4; "10" represents comb=8; and "11" represents N/A.

Field (3): a resource element (RE) offset value set of the PRS pattern of the SL-PRS. A field length of Field (3) may be associated with: a total number of symbol(s) of the SL-PRS in Field (5); and/or the comb value of the PRS pattern in Field (2). The field length of Field (3) can be various based on the total number of SL-PRS symbol (s) of the SL-PRS in Field (5) and/or the comb value of the PRS pattern in Field (2).

A total number of offset value(s) within the RE offset value set in Field (3) equals to a total number of symbol(s) of the SL-PRS in Field (5).

A UE can directly determine a SL-PRS RE offset based on the total number of SL-PRS symbol and/or the comb value, without this indication of Field (3).

Field (4): a frequency domain offset value of the PRS pattern of the SL-PRS. Field (4) may be marked as "K0" or the like. A field length of Field (4) may be associated with the comb value of the PRS pattern in Field (2). The field length of Field (4) can be various based on the comb value of the PRS pattern in Field (2).

In some embodiments, the field length of K0 may be 1 bit, 2 bits, 3 bits, or 4 bits for different configuration combinations of the PRS pattern. For instance:

1) If the comb value=2, K0 can be 1 bit to represent 2 offset values of the PRS pattern in the frequency domain, e.g., "0" represents K0=0, and "1" represents K0=1.

2) If the comb value=4, K0 can be 2 bits to represent 4 offset values of the PRS pattern in the frequency domain, e.g., "00" represents K0=0, "01" represents K0=1, "10" represents K0=2, and "11" represents K0=3.

3) If the comb value=8, K0 can be 3 bits to represent 8 offset values of the PRS pattern in the frequency domain, e.g., "000" represents K0=0, "001" represents K0=1, "010" represents K0=2, "011" represents K0=3, "100" represents K0=4, "101" represents K0=5, "110" represents K0=6, and "111" represents K0=7.

4) If the comb value can be three values 2, 4, and 8, K0 can be 4 bits to represent 14 offset values of the PRS pattern in the frequency domain and 2 reserved values, as shown in below table:

| Offset value represented by 4 bits | K0 |
|---|---|
| 0000 | K0 = 0 when the comb value = 2 |
| 0001 | K0 = 1 when the comb value = 2 |
| 0010 | K0 = 0 when the comb value = 4 |

-continued

| Offset value represented by 4 bits | K0 |
|---|---|
| 0011 | K0 = 1 when the comb value = 4 |
| 0100 | K0 = 2 when the comb value = 4 |
| 0101 | K0 = 3 when the comb value = 4 |
| 0110 | K0 = 0 when the comb value = 8 |
| 0111 | K0 = 1 when the comb value = 8 |
| 1000 | K0 = 2 when the comb value = 8 |
| 1001 | K0 = 3 when the comb value = 8 |
| 1010 | K0 = 4 when the comb value = 8 |
| 1011 | K0 = 5 when the comb value = 8 |
| 1100 | K0 = 6 when the comb value = 8 |
| 1101 | K0 = 7 when the comb value = 8 |
| 1110 | reserved |
| 1111 | reserved |

In some cases, K0 is an offset value per a UE. That is, the frequency domain offset value of the PRS pattern of the SL-PRS is dedicated for a UE and is a UE-specific offset value.

Field (5): a total number of symbol(s) of the SL-PRS. Field (5) may be marked as "number of SL-PRS symbol" or "total number of SL-PRS symbol" or the like.

For example, Field (5) can include 2 bits to represent 4 symbol types, i.e., "00" represents 6 symbols, "01" represents 7 symbols, "10" represents 9 symbols, and "11" represents 10 symbols.

Field (6): a start symbol of the SL-PRS in the time domain. Field (6) may be marked as "1_offset symbol" or "1_start symbol" or the like.

In operation 203, the SCI may be transmitted on a physical sidelink control channel (PSCCH) transmission; and/or a physical sidelink shared channel (PSSCH) transmission. According to some embodiments, the UE further determines (1) a total number of the PSCCH transmission; or (2) a total sub-channel number of the PSCCH transmission, or (3) a total sub-channel number of the PSCCH transmission and the PSSCH transmission. Specific examples are described in FIGS. 8 and 9.

Specifically, in these embodiments, if one of the abovementioned total numbers (1)-(3) is larger than one, the UE repeatedly transmits the PSCCH transmission and/or the PSSCH transmission according to the corresponding one total number. The total number of the PSCCH transmission may be determined based on a total number of sub-channel(s) of the SL-PRS; and/or a comb value of a PRS pattern of the SL-PRS. In that way, the total transmission power of PSCCH transmission symbol may be equal to the total transmission power of the SL-PRS transmission symbol. Or, the total transmission power of PSCCH transmission symbol and the PSSCH transmission symbol may be equal to the total transmission power of the SL-PRS transmission symbol.

In an embodiment, the DCI received in operation 201 may include at least one of the abovementioned total numbers (1)-(3). Then, based on the received DCI, a UE may determine at least one of the abovementioned total numbers (1)-(3). In another embodiment, the SCI transmitted in operation 203 may include at least one of the abovementioned total numbers (1)-(3). That is, the UE transmits at least one of the abovementioned total numbers (1)-(3) to other UE(s) by the SCI.

Details described in the embodiments as illustrated and shown in FIGS. 1 and 3-11, especially, contents related to information associated with a SL-PRS, are applicable for the embodiments as illustrated and shown in FIG. 2. Moreover, details described in the embodiments of FIG. 2 are applicable for all the embodiments of FIGS. 1 and 3-11.

FIG. 3 illustrates an exemplary flow chart of a method for transmitting information associated with a SL-PRS according to some embodiments of the present application. The embodiments of FIG. 3 may be performed by a BS (e.g., BS 102 illustrated and shown in FIG. 1). Although described with respect to a BS, it should be understood that other devices may be configured to perform a method similar to that of FIG. 3.

In the exemplary method 300 as shown in FIG. 3, in operation 301, a BS transmits PRS configuration information and/or DCI. In operation 302, the BS receiving information associated with a relative geographical position between two or more UEs.

According to some embodiments, the PRS configuration information and/or the DCI includes one or more fields. The one or more fields are associated with a SL-PRS. The relative geographical position between two or more UEs may be measured based on the SL-PRS.

Similar to the embodiment of FIG. 2, in some embodiments of FIG. 3, the PRS configuration information and/or the DCI includes at least one of Fields (1)-(6).

Field (1): a pattern index value of a PRS pattern of the SL-PRS. Specific examples of PRS patterns are described in FIGS. 5A-5D.

Field (2): a comb value of the PRS pattern of the SL-PRS.

Field (3): a resource element (RE) offset value set of the PRS pattern of the SL-PRS. A field length of Field (3) may be associated with: a total number of symbol(s) of the SL-PRS in Field (5); and/or the comb value of the PRS pattern in Field (2). A total number of offset value(s) within the RE offset value set in Field (3) equals to a total number of symbol(s) of the SL-PRS in Field (5).

Field (4): a frequency domain offset value of the PRS pattern of the SL-PRS. Field (4) may be marked as "K0" or the like. A field length of Field (4) may be associated with the comb value of the PRS pattern in Field (2). The field length of Field (4) can be various based on a comb value. For instance, the field length of K0 may be 1 bit, 2 bits, or 3 bits. In some cases, K0 is an offset value per a UE. That is, the frequency domain offset value of the PRS pattern is dedicated for a UE and is a UE-specific offset value.

Field (5): a total number of symbol(s) of the SL-PRS.

Field (6): a start symbol of the SL-PRS in the time domain. Field (6) may be marked as "1_offset symbol" or "1_start symbol" or the like.

According to some embodiments, the PRS configuration information transmitted in operation 301 includes information relating to available resource(s) in a resource pool in time and/or frequency domains. The information relating to the available resource(s) may include at least one of:

(1) a sub-channel index value regarding each of the available resource(s) in the resource pool;

(2) a sub-channel index indication in a bitmap manner regarding each of the available resource(s) and non-available resource(s) in the resource pool;

(3) a RB index value regarding each of the available resource(s) in the resource pool;

(4) a RB index indication in a bitmap manner regarding each of the available resource(s) and non-available resource(s) in the resource pool;

(5) a timeslot index value regarding each of the available resource(s) in the resource pool; and (6) a timeslot index indication in a bitmap manner regarding each of the available resource(s) and non-available resources(s) in the resource pool.

According to some embodiments, the DCI transmitted in operation 301 includes at least one of:

(1) a total number of PSCCH transmission(s);

(2) a total sub-channel number of PSCCH transmission(s); and (3) a total sub-channel number of PSCCH transmission(s) and PSSCH transmission(s). Specific examples are described in FIGS. 8 and 9.

Details described in the embodiments as illustrated and shown in FIGS. 1, 2, and 4-11, especially, contents related to information associated with a SL-PRS, are applicable for the embodiments as illustrated and shown in FIG. 3. Moreover, details described in the embodiments of FIG. 3 are applicable for all the embodiments of FIGS. 1, 2, and 4-11.

FIG. 4 illustrates an exemplary flow chart of SL-PRS configuration information according to some embodiments of the present application.

A SL-PRS can be transmitted in a dedicated SL-PRS resource pool, and related configuration information can be configured per a resource pool. As shown in FIG. 4, SL-PRS configuration information may include at least one of:

(1) A total number of SL-PRS symbols, e.g., which may be defined as any of {6, 7, 9, 10} in the first row of the table in FIG. 4. The total number of SL-PRS symbols may also be named as "a total number of symbols for a SL-PRS" or "a total symbol number of a SL-PRS" or the like.

For instance, in a resource pool, a total symbol number of a physical sidelink feedback channel (PSFCH) transmission may be 0 or 2. When the total number of SL-PRS symbols=6, a configuration of 14 symbols in one time slot includes: 1 AGC symbol, 3-symbol PSCCH transmission, 6-symbol SL-PRS, 2-symbol PSFCH transmission, and 1 GP symbol.

When the total number of SL-PRS symbols=7, a configuration of 14 symbols in one time slot includes: 1 AGC symbol, 2-symbol PSCCH transmission, 7-symbol SL-PRS, 2-symbol PSFCH transmission, and 1 GP symbol.

When the total number of SL-PRS symbols=9, a configuration of 14 symbols in one time slot includes: 1 AGC symbol, 3-symbol PSCCH transmission, 9-symbol SL-PRS, and 1 GP symbol.

When the total number of SL-PRS symbols=10, a configuration of 14 symbols in one time slot includes: 1 AGC symbol, 2-symbol PSCCH transmission, 10-symbol SL-PRS, and 1 GP symbol.

(2) A comb value, e.g., {2, 4, 8} in the first column of the table in FIG. 4, as defined in 3GPP standard document TS38.214.

(3) A SL-PRS RE offset set, as shown in each PRS pattern in the table in FIG. 4. The SL-PRS RE offset set is associated with the total number of SL-PRS symbols and the comb value. A total number of offset value(s) within the SL-PRS RE offset set equals to the total number of SL-PRS symbols.

As shown in the second row of the table in FIG. 4, when a comb value=2, a offset value within the SL-PRS RE offset set is 0 or 1. In particular:

(1) When a total number of SL-PRS symbols=6, there are 6 offset values within the SL-PRS RE offset set, i.e., SL-PRS RE offset set={0, 1, 0, 1, 0, 1}.

(2) When a total number of SL-PRS symbols=7, there are 7 offset values within the SL-PRS RE offset set, i.e., SL-PRS RE offset set={0, 1, 0, 1, 0, 1, 0}.

(3) When a total number of SL-PRS symbols=9, there are 9 offset values within the SL-PRS RE offset set, i.e., SL-PRS RE offset set={0, 1, 0, 1, 0, 1, 0, 1, 0}.

(4) When a total number of SL-PRS symbols=10, there are 10 offset values within the SL-PRS RE offset set, i.e., SL-PRS RE offset set={0, 1, 0, 1, 0, 1, 0, 1, 0, 1}.

Similarly, in the third row of the table in FIG. 4, when a comb value=4, a offset value within the SL-PRS RE offset set may be 0, 1, 2, or 3. In particular:

(1) When a total number of SL-PRS symbols=6, there are 6 offset values within the SL-PRS RE offset set, i.e., SL-PRS RE offset set={0, 2, 1, 3, 0, 2}.

(2) When a total number of SL-PRS symbols=7, there are 7 offset values within the SL-PRS RE offset set, i.e., SL-PRS RE offset set={0, 2, 1, 3, 0, 2, 1}.

(3) When a total number of SL-PRS symbols=9, there are 9 offset values within the SL-PRS RE offset set, i.e., SL-PRS RE offset set={0, 2, 1, 3, 0, 2, 1, 3, 0}.

(4) When a total number of SL-PRS symbols=10, there are 10 offset values within the SL-PRS RE offset set, i.e., SL-PRS RE offset set={0, 2, 1, 3, 0, 2, 1, 3, 0, 2}.

Similarly, in the fourth row of the table in FIG. 4, when a comb value=8, a offset value within the SL-PRS RE offset set is 0, 4, 2, 6, 1, 5, 3, 7. In particular:

(1) When a total number of SL-PRS symbols=6, there are 6 offset values within the SL-PRS RE offset set, i.e., SL-PRS RE offset set={0, 4, 2, 6, 1, 5}.

(2) When a total number of SL-PRS symbols=7, there are 7 offset values within the SL-PRS RE offset set, i.e., SL-PRS RE offset set={0, 4, 2, 6, 1, 5, 3}.

(3) When a total number of SL-PRS symbols=9, there are 9 offset values within the SL-PRS RE offset set, i.e., SL-PRS RE offset set={0, 4, 2, 6, 1, 5, 3, 7, 0}.

(4) When a total number of SL-PRS symbols=10, there are 10 offset values within the SL-PRS RE offset set, i.e., SL-PRS RE offset set={0, 4, 2, 6, 1, 5, 3, 7, 0, 4}.

The table in FIG. 4 shows 12 exemplary PRS patterns of a SL-PRS with specific SL-PRS configuration information. Each of these 12 PRS patterns has an index value, i.e., Pattern index=0, 1, 2, 3, 4, 5, 6, 7, 8, 9, 10, and 11 as shown in FIG. 4. Each PRS pattern includes several REs in one timeslot, and each RE is shown as a black piece in FIG. 4. A timeslot includes 14 symbols in total. Different PRS patterns may correspond to different total number of SL-PRS symbols in a timeslot.

For example, the first PRS pattern, i.e., Pattern index=0, corresponds to the total number of SL-PRS symbols=6 in the first row of the table in FIG. 4, and thus the first PRS pattern includes 6 symbols in a timeslot in total. The second PRS pattern, i.e., Pattern index=1, corresponds to the total number of SL-PRS symbols=7 in the first row of the table in FIG. 4, and thus the second PRS pattern includes 7 symbols in a timeslot in total. Other PRS patterns in FIG. 4 have similar configurations and formats.

The abovementioned Field (6), i.e., "1_offset symbol" as shown in FIG. 4, represents a start symbol of the SL-PRS in the time domain. For example, the first PRS pattern, i.e., Pattern index=0, starts from the fifth symbol in one timeslot, which is represented by 1_offset symbol=4. The second PRS pattern, i.e., Pattern index=1, starts from the fourth symbol in one timeslot, which is represented by 1_offset symbol=3. Other PRS patterns in FIG. 4 have similar configurations and formats.

In some embodiments, optionally, the SL-PRS configuration information further includes a frequency domain offset value of a PRS pattern of a SL-PRS, i.e., the abovementioned Field (4) "K0". K0 can be configured to a fixed value per a UE, or can be indicated by DCI, or be a variable value. For example, K0 may be named as "per UE offset value" or the like. K0 is an offset value in frequency domain per a UE with respect to "subcarrier 0" of a physical resource block (PRB) of a PRS pattern. The embodiments of FIG. 4 assume that K0=0. Accordingly, the left bottom RE in each PRS pattern in FIG. 4 starts from the first RE of the first symbol within the PRS pattern. Different K0 values are described in the embodiments of FIGS. 5A-5D.

A SL-PRS can be transmitted in a sub-set of time and/or frequency resources in a sidelink resource pool (e.g., an existing resource pool for a data transmission). In some embodiments, the SL-PRS configuration information further includes a configuration parameter which indicates available resource(s) in time and/or frequency domains, e.g., in RRC signaling. For instance, the configuration parameter indicates a sub-channel index or a RB index, and/or a timeslot index in a sidelink resource pool.

Details described in the embodiments as illustrated and shown in FIGS. 1-3 and 5-11, especially, contents related to SL-PRS configuration information, are applicable for the embodiments as illustrated and shown in FIG. 4. Moreover, details described in the embodiments of FIG. 4 are applicable for all the embodiments of FIGS. 1-3 and 5-11.

FIGS. 5A-5D illustrate exemplary diagrams of a UE PRS pattern according to some embodiments of the present application. The embodiments of FIGS. 5A-5D show exemplary PRS patterns of four UEs, i.e., UE-1 PRS pattern, UE-2 PRS pattern, UE-3 PRS pattern, and UE-4 PRS pattern.

Figure 5A:
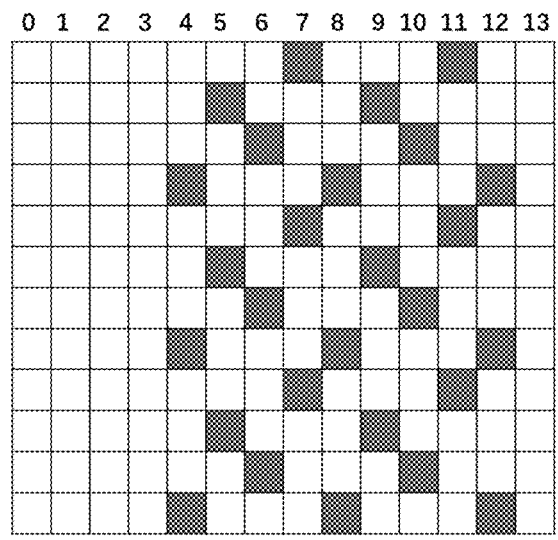
FIGS. 5A-5D illustrate exemplary diagrams of a UE PRS pattern according to some embodiments of the present application.

UE-1 PRS pattern as shown in FIG. 5A is the same as the seventh PRS pattern in the embodiments of FIG. 4, i.e., Pattern index=6. UE-1 PRS pattern corresponds to the SL-PRS configuration information: a total number of SL-PRS symbols=9, a comb value=4, a SL-PRS RE offset set={0, 2, 1, 3, 0, 2, 1, 3, 0}, K0=0, and 1_offset symbol=4.

For example, the SL-PRS RE offset set {0, 2, 1, 3, 0, 2, 1, 3, 0} means that, in the frequency domain, the RE offset is 0 on the first symbol within UE-1 PRS pattern, the RE offset is 2 on the second symbol within UE-1 PRS pattern, the RE offset is 1 on the third symbol within UE-1 PRS pattern, the RE offset is 3 on the fourth symbol within UE-1 PRS pattern, the RE offset is 0 on the fifth symbol within UE-1 PRS pattern, the RE offset is 2 on the sixth symbol within UE-1 PRS pattern, the RE offset is 1 on the seventh symbol within UE-1 PRS pattern, the RE offset is 3 on the eighth symbol within UE-1 PRS pattern, and the RE offset is 0 on the ninth symbol within UE-1 PRS pattern. K0=0 means that, in frequency domain, an offset value with respect to "subcarrier 0" of a PRB of UE-1 PRS pattern is 0.

Figure 5B:
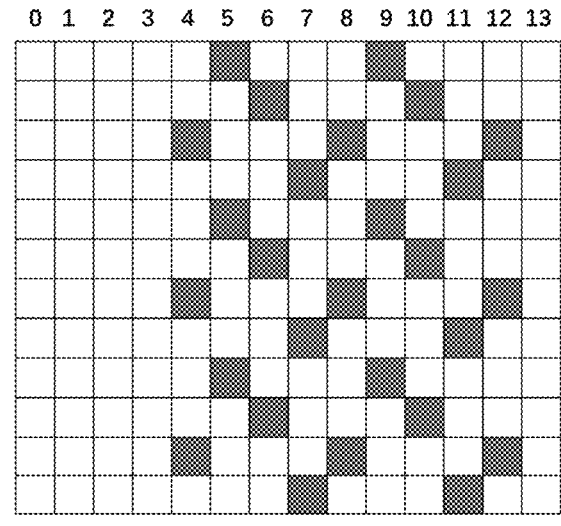
Figure 5C:
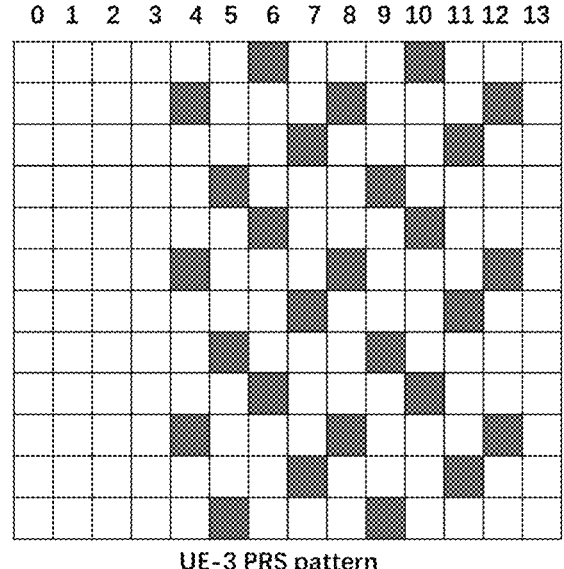
Figure 5D:
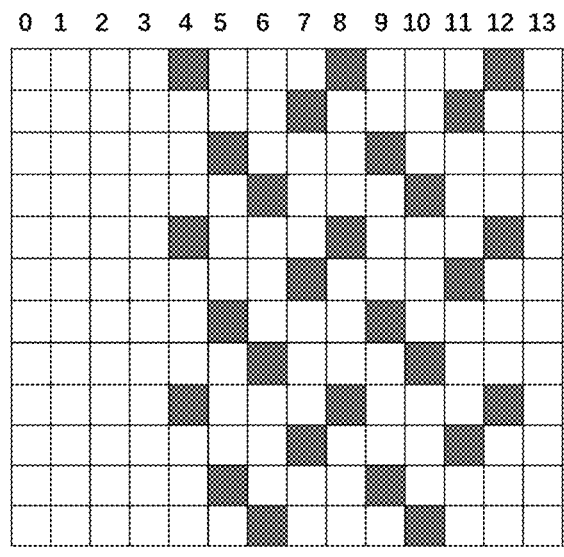

UE-2 PRS pattern, UE-3 PRS pattern, and UE-4 PRS pattern respectively shown in FIGS. 5B-5D are similar to UE-1 PRS pattern in FIG. 5A. The PRS patterns in FIGS. 5B-5D correspond to the same total number of SL-PRS symbols, the same comb value, the same SL-PRS RE offset set, and the same 1_offset symbol as those of UE-1 PRS pattern in FIG. 5A. However, the PRS patterns in FIGS. 5B-5D correspond to different K0 values from K0=0 of UE-1 PRS pattern in FIG. 5A. In particular:

1) UE-1 PRS pattern in FIG. 5A corresponds to K0=0, and the left bottom RE in UE-1 PRS pattern starts from the first RE of the first symbol within UE-1 PRS pattern.

2) UE-2 PRS pattern in FIG. 5B corresponds to K0=1, and the left bottom RE of UE-2 PRS pattern starts from the second RE of the first symbol within UE-2 PRS pattern.

3) UE-3 PRS pattern in FIG. 5C corresponds to K0=2, and the left bottom RE of UE-3 PRS pattern starts from the third RE of the first symbol within UE-3 PRS pattern.

4) UE-4 PRS pattern in FIG. 5D corresponds to K0=3, and the left bottom RE of UE-4 PRS pattern starts from the fourth RE of the first symbol within UE-4 PRS pattern.

Details described in the embodiments as illustrated and shown in FIGS. 1-4 and 6-11, especially, contents related to a UE PRS pattern, are applicable for the embodiments as illustrated and shown in FIGS. 5A-5D. Moreover, details described in the embodiments of FIGS. 5A-5D are applicable for all the embodiments of FIGS. 1-4 and 6-11.

Figure 6A:
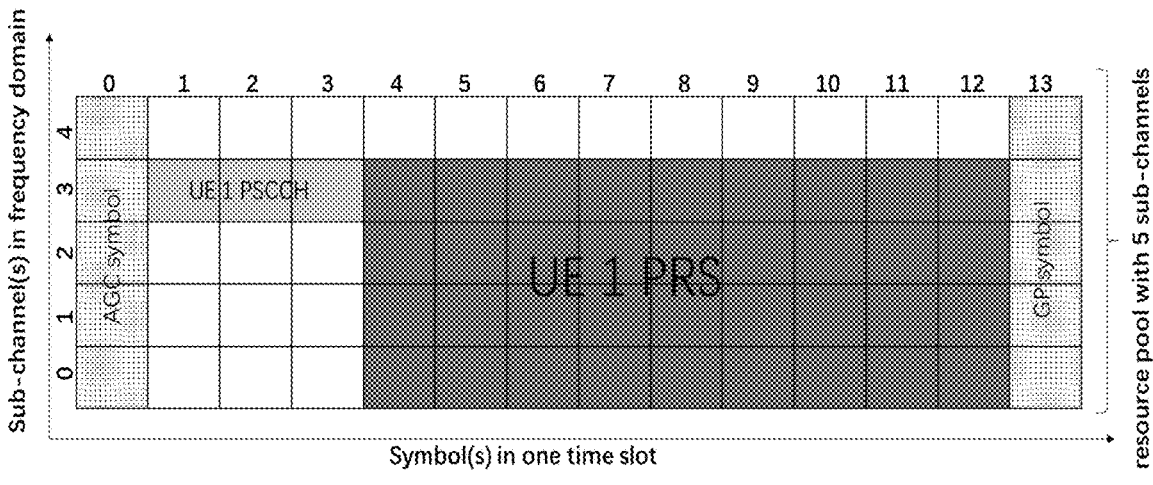
FIG. 6A illustrates an exemplary diagram of a UE PRS transmission according to some embodiments of the present application.

FIG. 6A illustrates an exemplary diagram of a UE PRS transmission according to some embodiments of the present application.

FIG. 6A shows one exemplary UE PRS transmission, i.e., UE 1 PRS transmission within one time slot. As shown in FIG. 6A, there are 14 symbols in one time slot in time domain, and these 14 symbols are marked as 0, 1, 2, 3, 4, 5, 6, 7, 8, 9, 10, 11, 12, and 13, respectively. The embodiments of FIG. 6A refer to a resource pool with 5 sub-channels in frequency domain, and these 5 sub-channels are marked as 0, 1, 2, 3, and 4, respectively.

In particular, symbol 0 in the time slot and sub-channels 0, 1, 2, 3, and 4 in frequency domain carry an automatic gain control (AGC) symbol. Symbols 1-3 in the time slot and sub-channel 3 in frequency domain carry UE 1 PSCCH transmission. Symbol 4 to symbol 12 in the time slot and sub-channels 0, 1, 2, and 3 in frequency domain carry UE 1 PRS transmission. Symbol 13 in the time slot and sub-channels 0, 1, 2, 3, and 4 in frequency domain carry a guard period (GP) symbol. In other words, UE 1 PSCCH transmission is carried by 1 sub-channel in frequency domain and 3 symbols in time domain. UE 1 PRS transmission is carried by 4 sub-channels in frequency domain and 9 symbols in time domain.

According to agreements of 3GPP standard document, a total number of PRBs for a possible sub-channel size may be defined as any of {10, 15, 20, 25, 50, 75, 100}. One value of the above set is (pre-)configured for the sub-channel size for a resource pool. For example, in the embodiments of FIG. 6A, UE 1 PRS transmission is carried by 4 sub-channels in frequency domain in total. If a total number of PRBs for a sub-channel size in UE 1 PRS transmission is (pre-)configured as "10", each sub-channel within sub-channels 0, 1, 2, and 3 in frequency domain includes 10 PRBs, and each PRB corresponds to a PRS pattern. A specific format of UE 1 PRS transmission is described in FIG. 6B.

Figure 6B:
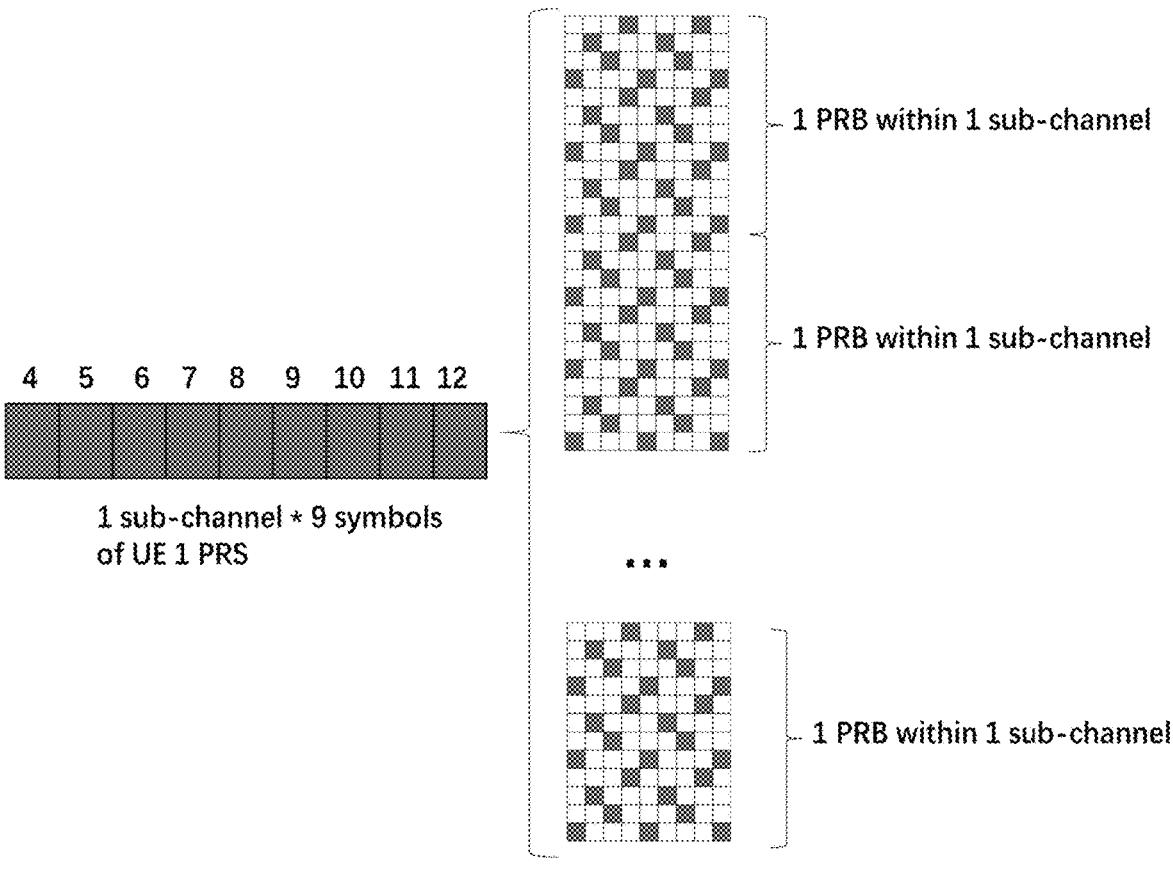
FIG. 6B illustrates an exemplary diagram of a sub-channel format within a UE PRS transmission according to some embodiments of the present application.

FIG. 6B illustrates an exemplary diagram of a sub-channel format within a UE PRS transmission according to some embodiments of the present application.

As described above, UE 1 PRS transmission is carried by 4 sub-channels in frequency domain and 9 symbols in time domain, which may be named as "4 sub-channels*9 symbols" or the like. FIG. 6B shows a specific format of "1 sub-channel*9 symbols" of UE 1 PRS transmission.

In a case that a total number of PRBs for a sub-channel size in UE 1 PRS transmission is (pre-)configured as "10", "1 sub-channel*9 symbols" of UE 1 PRS transmission include 10 PRBs within 1 sub-channel in frequency domain. Each of these 10 PRBs includes 9 symbols in time domain in total. In a case that a total number of PRBs for a sub-channel size in UE 1 PRS transmission is (pre-)configured as "15", "1 sub-channel*9 symbols" of UE 1 PRS transmission include 15 PRBs within 1 sub-channel in frequency domain. Other different sub-channel sizes may be configured to the embodiments of FIG. 6B in different cases.

As an example, FIG. 6B illustrates three PRBs within 1 sub-channel. Each PRB within 1 sub-channel corresponds to the same PRS pattern. For instance, as shown in FIG. 6B, each PRB within 1 sub-channel corresponds to UE-1 PRS pattern as shown in FIG. 5A, i.e., Pattern index=6 in the table in FIG. 4.

Details described in the embodiments as illustrated and shown in FIGS. 1-5D and 7-11, especially, contents related to a UE PRS transmission, are applicable for the embodiments as illustrated and shown in FIGS. 6A and 6B. Moreover, details described in the embodiments of FIGS. 6A and 6B are applicable for all the embodiments of FIGS. 1-5D and 7-11.

Figure 7A:
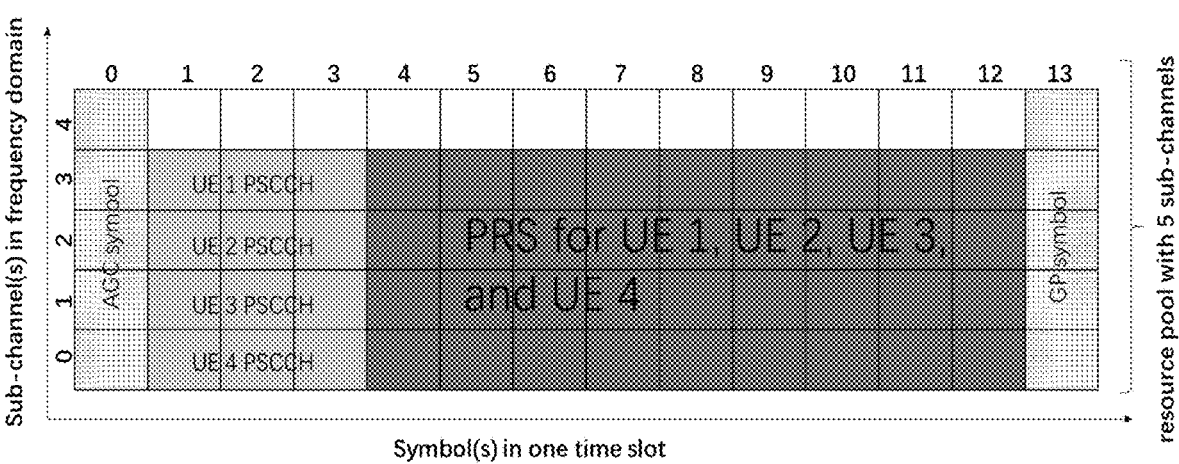
FIGS. 7A and 7B illustrate exemplary diagrams of four UEs PRS transmission according to some embodiments of the present application.
Figure 7B:
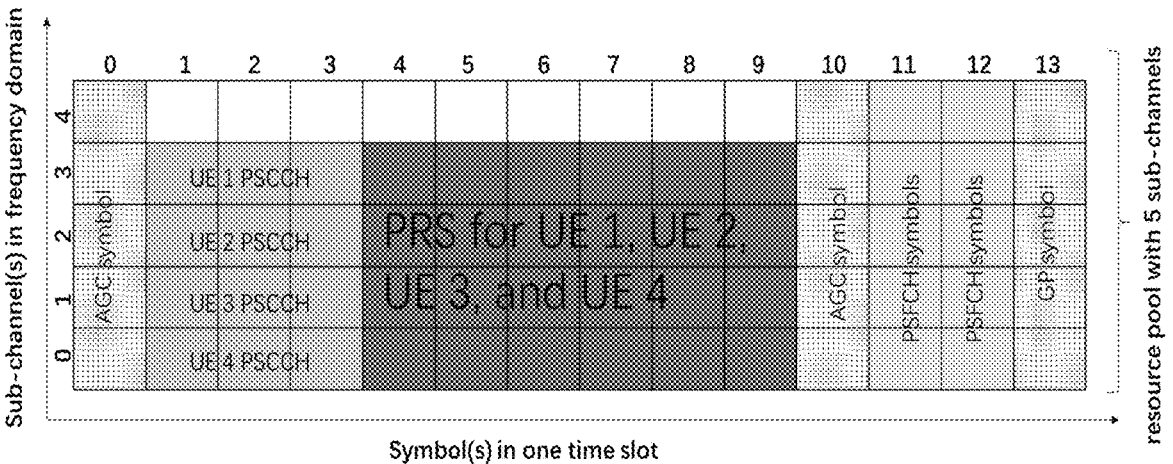

FIGS. 7A and 7B illustrate exemplary diagrams of four UEs PRS transmission according to some embodiments of the present application. Similar to FIG. 6A, FIGS. 7A and 7B also shows 14 symbols in one time slot in time domain (which are marked as 0 to 13, respectively) and a resource pool with 5 sub-channels in frequency domain (which are marked as 0 to 4, respectively).

FIGS. 7A and 7B show an exemplary PRS transmission for four UEs within one time slot, i.e., a PRS transmission for UE 1, UE 2, UE 3, and UE 4. In particular, in FIGS. 7A and 7B, symbol 0 in the time slot and sub-channels 0, 1, 2, 3, and 4 in frequency domain carry an AGC symbol. Symbols 1-3 in the time slot and sub-channels 0, 1, 2, and 3 in frequency domain carry UE 1 PSCCH transmission, UE 2 PSCCH transmission, UE 3 PSCCH transmission, and UE 4 PSCCH transmission, respectively. In other words, UE 1 PSCCH transmission, UE 2 PSCCH transmission, UE 3 PSCCH transmission, or UE 4 PSCCH transmission is carried by 1 sub-channel in frequency domain and 3 symbols in time domain. Symbol 13 in the time slot and sub-channels 0, 1, 2, 3, and 4 in frequency domain carry a GP symbol.

Each of UE 1 PSCCH transmission, UE 2 PSCCH transmission, UE 3 PSCCH transmission, and UE 4 PSCCH transmission includes 3 symbols in time domain as shown in the embodiments of FIGS. 7A and 7B, and may include 2 symbols in time domain in some other embodiments. According to agreements of 3GPP standard document, candidate numbers of PRBs for 2-symbol PSCCH transmission and 3-symbol PSCCH transmission may be defined as any of {10, 12 15, 20, 25}.

Two PRS transmissions for UE 1, UE 2, UE 3, and UE 4 in FIGS. 7A and 7B are carried by different total symbol numbers in time domain. Thus, each PRB within 1 sub-channel of the PRS transmission for UE 1 to UE 4 in the embodiments of FIG. 7A corresponds to different PRS patterns from that in the embodiments of FIG. 7B.

In the embodiments of FIG. 7A, symbol 4 to symbol 12 in the time slot and sub-channels 0, 1, 2, and 3 in frequency domain carry a PRS transmission for UE 1, UE 2, UE 3, and UE 4. UE 1 PRS transmission is carried by 4 sub-channels in frequency domain and 9 symbols in time domain.

In the embodiments of FIG. 7B, symbol 4 to symbol 9 in the time slot and sub-channels 0, 1, 2, and 3 in frequency domain carry a PRS transmission for UE 1, UE 2, UE 3, and UE 4. UE 1 PRS transmission is carried by 4 sub-channels in frequency domain and 6 symbols in time domain. Symbol 10 in the time slot and sub-channels 0, 1, 2, 3, and 4 in frequency domain carry an AGC symbol. Symbols 11 and 12 in the time slot and sub-channels 0, 1, 2, 3, and 4 in frequency domain carry PSFCH symbols, i.e., 2-symbol PSFCH transmission in time domain.

According to agreements of 3GPP standard document, a total number of PRBs for a sub-channel size in FIGS. 7A and 7B may be defined as any of {10, 15, 20, 25, 50, 75, 100}. Since the PRS transmission for UE 1 to UE 4 in FIG. 7A and UE 1 PRS transmission in FIG. 6A are both carried by 9 symbols in time domain, each PRB within 1 sub-channel in FIG. 6A or FIG. 7A may correspond to the same PRS pattern. For example, "1 sub-channel*9 symbols" of the PRS transmission for UE 1 to UE 4 in FIG. 7A may also adopt the specific PRS pattern shown in FIG. 6B, i.e., Pattern index=6 in the embodiments of FIG. 4, in which a total number of SL-PRS symbols=9.

Since the PRS transmission for UE 1 to UE 4 in FIG. 7B is carried by 6 symbols in time domain, each PRB within 1 sub-channel in FIG. 7B correspond to a different PRS pattern from the PRS pattern of FIG. 6A or FIG. 7A. For example, "1 sub-channel*9 symbols" of the PRS transmission for UE 1 to UE 4 in FIG. 7B may also adopt the fifth PRS pattern in the table of FIG. 4, i.e., Pattern index=4, in which a total number of SL-PRS symbols=6.

Details described in the embodiments as illustrated and shown in FIGS. 1-6B and 8-11, especially, contents related to a UE PRS transmission, are applicable for the embodiments as illustrated and shown in FIGS. 7A and 7B. Moreover, details described in the embodiments of FIGS. 7A and 7B are applicable for all the embodiments of FIGS. 1-6B and 8-11.

Figure 8:
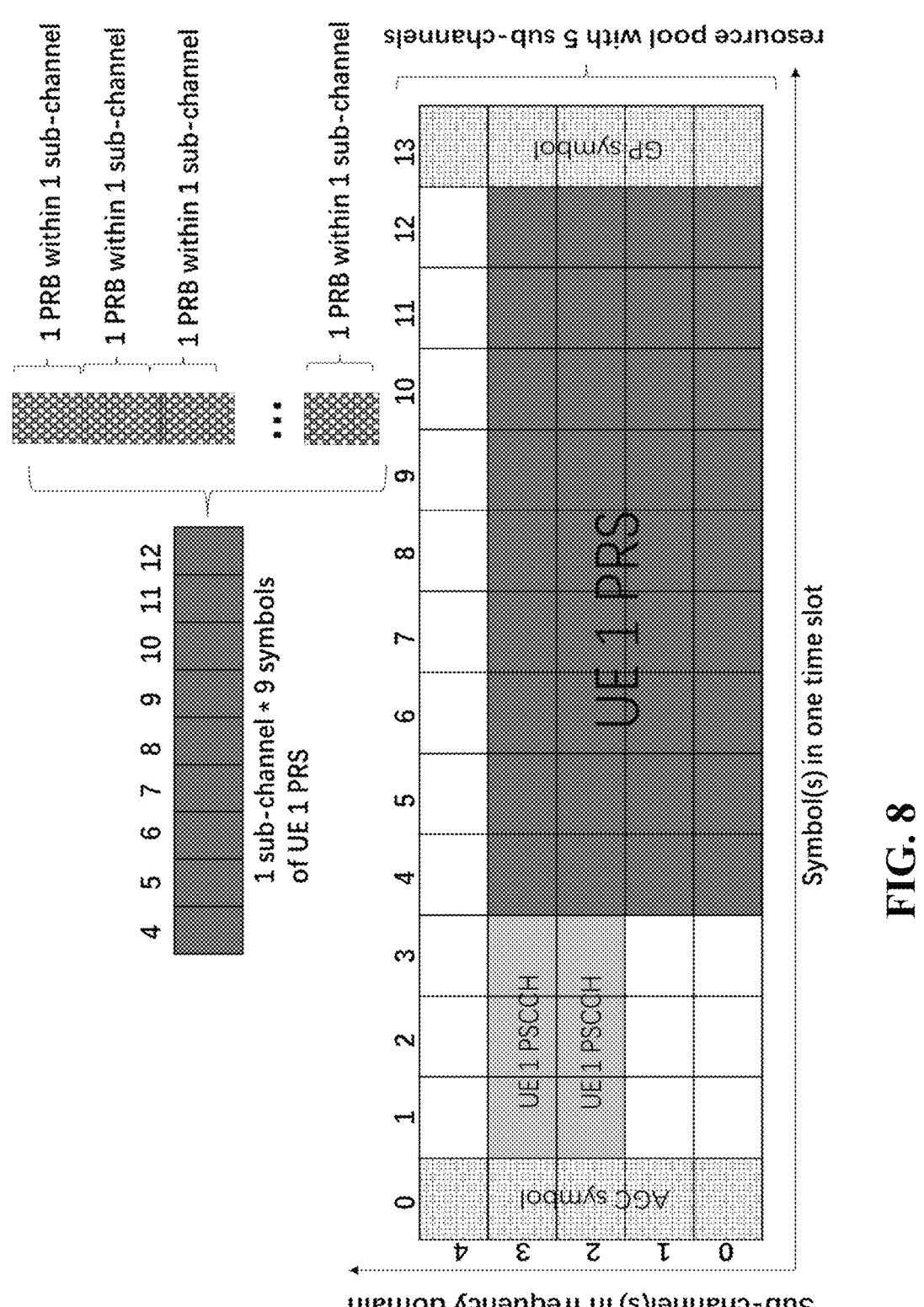
FIG. 8 illustrates an exemplary diagram of a UE PRS transmission with PSCCH transmission(s) according to some embodiments of the present application.
Figure 9:
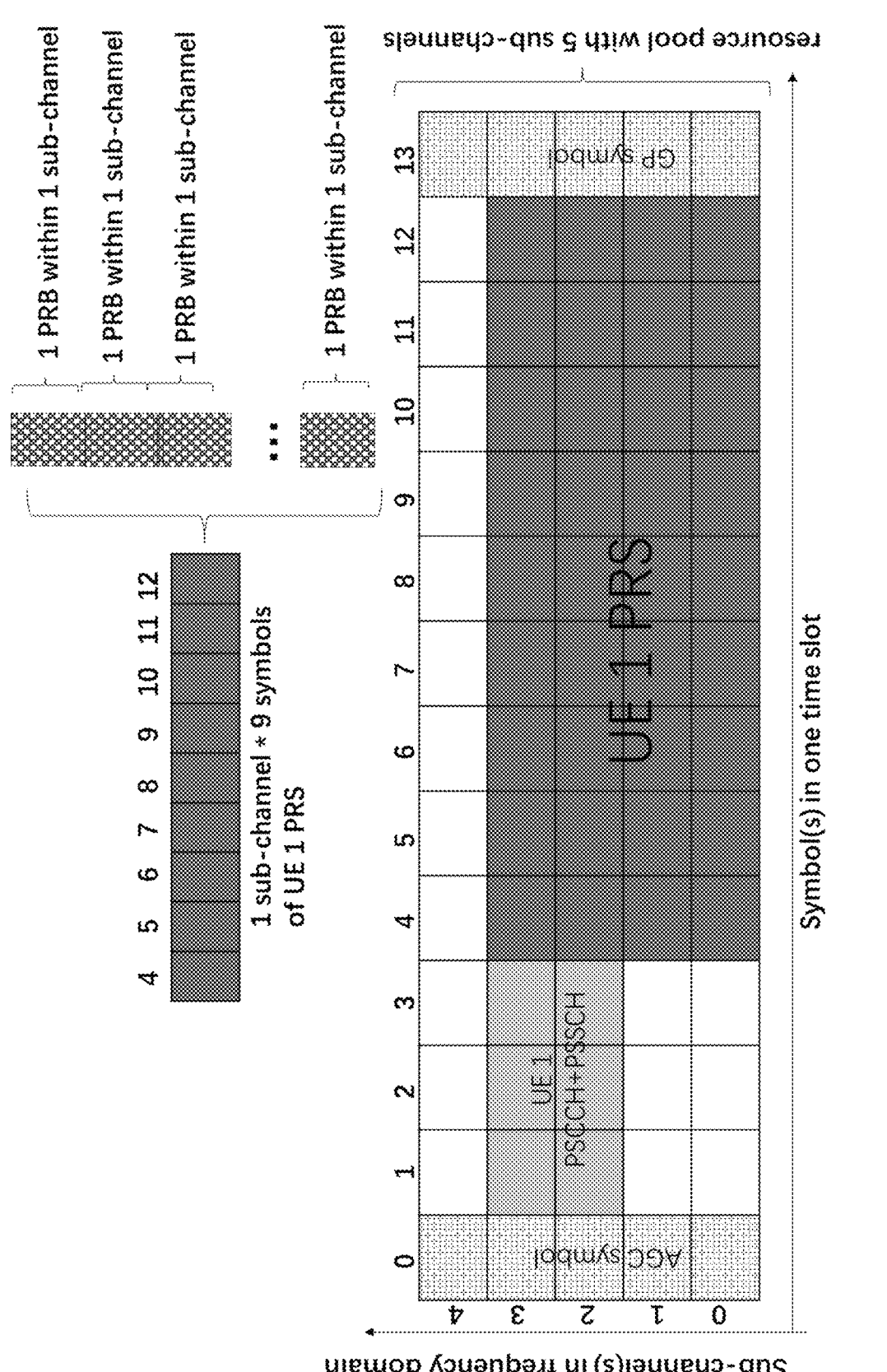
FIG. 9 illustrates an exemplary diagram of a UE PRS transmission with PSCCH transmission(s) and PSSCH transmission(s) according to some embodiments of the present application.

The embodiments of FIGS. 8 and 9 provide a reception design of a PSCCH transmission or a PSCCH+PSSCH transmission(s) design to avoid an AGC issue.

FIG. 8 illustrates an exemplary diagram of a UE PRS transmission with PSCCH transmission(s) according to some embodiments of the present application.

The same as FIG. 6A, FIG. 8 shows 14 symbols in onetime slot in time domain (which are marked as 0 to 13, respectively) and a resource pool with 5 sub-channels in frequency domain (which are marked as 0 to 4, respectively). The same as FIG. 6A, FIG. 8 also shows a AGC symbol in symbol 0, UE 1 PRS transmission which includes 9 symbols within one time slot (i.e., symbol 4 to symbol 12) and 4 sub-channels in frequency domain (i.e., sub-channels 0, 1, 2, and 3), and a GP symbol in symbol 13.

Similar to FIG. 6B, in the embodiments of FIG. 8, if a total number of PRBs for a sub-channel size in UE 1 PRS transmission is (pre-)configured as "10" or "15", "1 sub-channel*9 symbols" of UE 1 PRS transmission include 10 PRBs or 15 PRBs within 1 sub-channel in frequency domain. Each of these PRBs includes 9 symbols in time domain in total. Other different sub-channel sizes may also be configured to the embodiments of FIG. 8.

Similar to FIG. 6B, FIG. 8 shows a specific format of "1 sub-channel*9 symbols" of UE 1 PRS transmission. In particular, FIG. 8 shows four PRBs within 1 sub-channel. Each PRB within 1 sub-channel corresponds to the same PRS pattern. Different from the embodiments of FIG. 6B, for instance, in the embodiments of FIG. 8, a comb value=2, and a total number of SL-PRS symbols=9. Thus, the PRS pattern in the embodiments of FIG. 8 is different from that of the embodiments of FIG. 6B. As shown in FIG. 8, each PRB within 1 sub-channel corresponds to the third PRS pattern shown in FIG. 4, i.e., Pattern index=2.

Other different PRS pattern parameters may also be configured to the embodiments of FIG. 8. That is, "1 sub-channel*9 symbols" of UE 1 PRS transmission in the embodiments of FIG. 8 may correspond to different PRS patterns according to different PRS pattern parameters.

Different from the embodiments of FIGS. 6A and 6B, in the embodiments of FIG. 8, if UE 1 transmits a PRS pattern with the comb value=2 on 4 sub-channels, UE 1 transmits PSCCH transmissions on 2 sub-channels. That is, two UE1 PSCCH transmissions are carried in symbols 1-3 in the time slot and sub-channels 2 and 3 in frequency domain as shown in FIG. 8. Such design may be used to avoid an AGC issue. Specific configurations of a total number of PSCCH transmission(s) are described in FIG. 10.

Details described in the embodiments as illustrated and shown in FIGS. 1-7B and 9-11, especially, contents related to a UE PRS transmission, are applicable for the embodiments as illustrated and shown in FIG. 8. Moreover, details described in the embodiments of FIG. 8 are applicable for all the embodiments of FIGS. 1-7B and 9-11.

FIG. 9 illustrates an exemplary diagram of a UE PRS transmission with PSCCH transmission(s) and PSSCH transmission(s) according to some embodiments of the present application.

The embodiments of FIG. 9 have the same time and frequency configurations for UE 1 PRS transmission (i.e., 9 symbols within one time slot and 4 sub-channels in frequency domain), a ACG symbol, and a GP symbol and the same PRS pattern parameters for "1 sub-channel*9 symbols" of UE 1 PRS transmission as the embodiments of FIG. 8. That is, the same as FIG. 8, each PRB within 1 sub-channel as shown in FIG. 9 corresponds to the third PRS pattern shown in the table of FIG. 4, i.e., Pattern index=2.

Different from the embodiments of FIG. 8, in the embodiments of FIG. 9, when UE 1 transmits a PRS pattern with the comb value=2 on 4 sub-channels, UE 1 transmits PSCCH and PSSCH transmissions on 2 sub-channels. Such design may be used to avoid an AGC issue. Specific configurations of a total number of PSCCH and PSSCH transmission(s) are described in FIG. 10.

In an example, in the embodiments of FIG. 9, a PSCCH transmission may be carried in symbols 1-3 in the time slot and sub-channel 3 in frequency domain, and a PSSCH transmission may be carried in symbols 1-3 in the time slot and sub-channel 2 in frequency domain. In a further example, in the embodiments of FIG. 9, a PSCCH transmission may be carried in symbols 1 and 2 in the time slot and sub-channel 2 and/or sub-channel 3 in frequency domain, and a PSSCH transmission may be carried in symbol 3 in the time slot and sub-channel 2 and/or sub-channel 3 in frequency domain.

Details described in the embodiments as illustrated and shown in FIGS. 1-8, 10, and 11, especially, contents related to a UE PRS transmission, are applicable for the embodiments as illustrated and shown in FIG. 9. Moreover, details described in the embodiments of FIG. 9 are applicable for all the embodiments of FIGS. 1-8, 10, and 11.

Figures 10, 11:
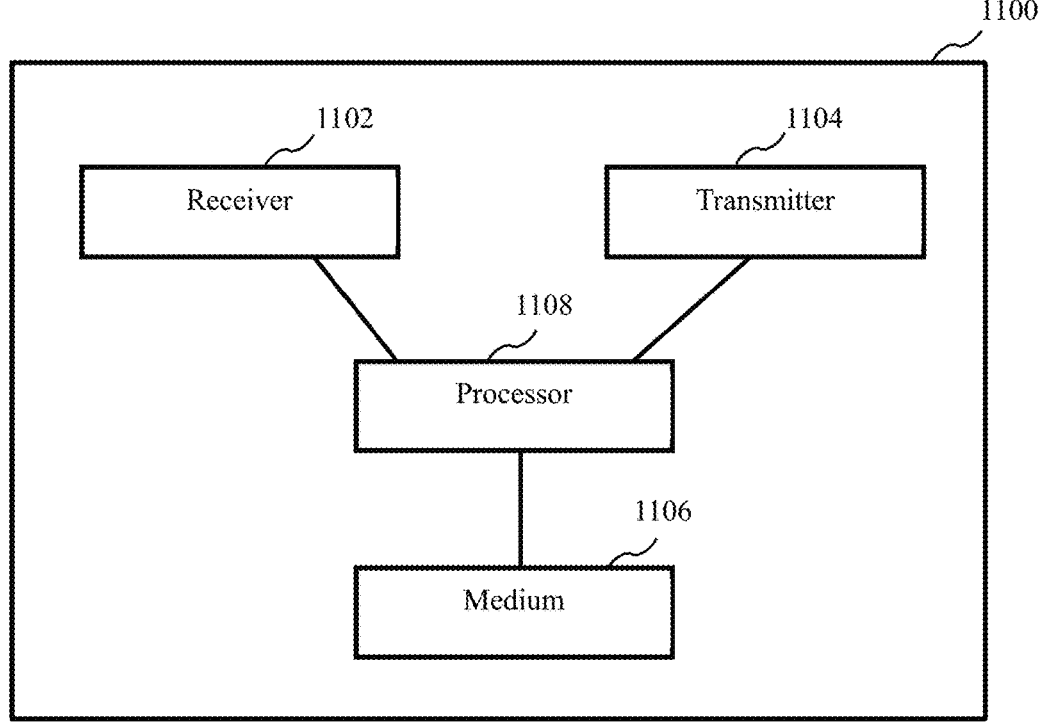
FIG. 10 illustrates an exemplary diagram of a total number of PSCCH transmission(s) or a total number of PSCCH and PSSCH transmission(s) according to some embodiments of the present application.
FIG. 11 illustrates an exemplary block diagram of an apparatus according to some embodiments of the present application.

FIG. 10 illustrates an exemplary diagram of a total number of PSCCH transmission(s) or a total number of PSCCH and PSSCH transmission(s) according to some embodiments of the present application.

In the embodiments of FIG. 10, a UE may determine a total number of PSCCH transmission(s) in frequency domain or a sub-channel size of PSCCH and PSSCH transmission(s) in frequency domain based on a comb value and a total number of sub-channel(s) for a SL-PRS. The sub-channel size of PSCCH and PSSCH transmission(s) in frequency domain may also be named as "a total number of PSCCH+PSSCH transmission(s)."

The table in FIG. 10 defines specific configurations of a total number of PSCCH transmission(s) or a total number of PSCCH+PSSCH transmission(s). For example, in the table in FIG. 10, a total number of sub-channel(s) for a SL-PRS may be 2, 4, 6, 8, or 10, and a comb value may be 2, 4, or 8. In particular:

(1) If the total number of sub-channel(s) for a SL-PRS=2 and the comb value=2, a total number of PSCCH transmission(s)=1 or a total number of PSCCH+ PSSCH transmission(s)=1, which means that only 1 PSCCH transmission is transmitted, and there is no repetition of the PSCCH transmission or no PSSCH transmission.

(2) If the total number of sub-channel(s) for a SL-PRS=4 and the comb value=2, a total number of PSCCH transmission(s)=2 or a total number of PSCCH+ PSSCH transmission(s)=2. The total number of PSCCH transmission(s)=2 means that 2 PSCCH transmissions in total are transmitted, i.e., 1 PSCCH transmission and 1 repetition of the PSCCH transmission are transmitted. FIG. 8 corresponds to this case. The total number of PSCCH+PSSCH transmission(s)=2 means that 1 PSCCH transmission and 1 PSSCH transmission are transmitted. FIG. 9 corresponds to this case.

(3) If the total number of sub-channel(s) for a SL-PRS=4 and the comb value=4, a total number of PSCCH transmission(s)=1 or a total number of PSCCH+ PSSCH transmission(s)=1, i.e., only 1 PSCCH transmission is transmitted, and there is no repetition of the PSCCH transmission or no PSSCH transmission.

(4) If the total number of sub-channel(s) for a SL-PRS=6 and the comb value=2, a total number of PSCCH transmission(s)=3, or a total number of PSCCH+ PSSCH transmission(s)=3. The total number of PSCCH transmission(s)=3 means that 3 PSCCH transmissions in total are transmitted, i.e., 1 PSCCH transmission and 2 repetitions of the PSCCH transmission are transmitted. The total number of PSCCH+PSSCH transmission(s)=3 means that 1 PSCCH transmission and 2 PSSCH transmissions in total are transmitted.

(5) If the total number of sub-channel(s) for a SL-PRS=8 and the comb value=2, a total number of PSCCH transmission(s)=4, or a total number of PSCCH+ PSSCH transmission(s)=4. The total number of PSCCH transmission(s)=4 means that 4 PSCCH transmissions in total are transmitted, i.e., 1 PSCCH transmission and 3 repetitions of the PSCCH transmission are transmitted. The total number of PSCCH+PSSCH transmission(s)=4 means that 1 PSCCH transmission and 3 PSSCH transmissions in total are transmitted.

(6) If the total number of sub-channel(s) for a SL-PRS=8 and the comb value=4, a total number of PSCCH transmission(s)=2 or a total number of PSCCH+ PSSCH transmission(s)=2. The total number of PSCCH transmission(s)=2 means that 2 PSCCH transmissions in total are transmitted, i.e., 1 PSCCH transmission and 1 repetition of the PSCCH transmission is transmitted. The total number of PSCCH+PSSCH transmission(s)=2 means that 1 PSCCH transmission and 1 PSSCH transmission in total are transmitted.

(7) If the total number of sub-channel(s) for a SL-PRS=8 and the comb value=8, a total number of PSCCH transmission(s)=1 or a total number of PSCCH+ PSSCH transmission(s)=1, i.e., only 1 PSCCH transmission is transmitted, and there is no repetition of the PSCCH transmission or no PSSCH transmission.

(8) If the total number of sub-channel(s) for a SL-PRS=10 and the comb value=2, a total number of PSCCH transmission(s)=5 or a total number of PSCCH+ PSSCH transmission(s)=5. The total number of PSCCH transmission(s)=5 means that 5 PSCCH transmissions in total are transmitted, i.e., 1 PSCCH transmission and 4 repetitions of the PSCCH transmission are transmitted. The total number of PSCCH+PSSCH transmission(s)=5 means that 1 PSCCH transmission and 4 PSSCH transmissions in total are transmitted.

In some embodiments, a total number of PSCCH transmission(s) can be transmitted in DCI or SCI. In some other embodiments, a UE determines a total number of PSCCH transmission(s) in SCI based on an indication of DCI.

Specifically, if the total number of PSCCH transmission(s) is transmitted as a field in DCI or SCI, this field in the DCI or SCI may have various values based on a total number of sub-channel(s) for a SL-PRS in frequency domain, and the total number of sub-channel(s) for the SL-PRS is associated with a size of a resource pool and a sub-channel size. For example, in a case of 20 Mhz bandwidth (100 RBs), the sub-channel size can be any off{10, 15, 20, 25, 50, 75, 100} PRBs, the total number of sub-channel(s) for the SL-PRS can be any of {10, 8, 5, 4, 2, 2, 1}, and a field length of this field in the DCI or SCI can be any of {3 bits, 2 bits, 1 bit}. Alternatively, a field length of the field in the DCI or SCI may be fixed to 3 bits, 2 bits, or 1 bit.

Details described in the embodiments as illustrated and shown in FIGS. 1-9 and 11, especially, contents related to determining a total number of PSCCH repetition(s), are applicable for the embodiments as illustrated and shown in FIG. 10. Moreover, details described in the embodiments of FIG. 10 are applicable for all the embodiments of FIGS. 1-9 and 11.

FIG. 11 illustrates an exemplary block diagram of an apparatus according to some embodiments of the present application. In some embodiments of the present application, the apparatus 1100 may be a UE, which can at least perform the method illustrated in any one of FIGS. 2-10.

As shown in FIG. 11, the apparatus 1100 may include at least one receiver 1102, at least one transmitter 1104, at least one non-transitory computer-readable medium 1106, and at least one processor 1108 coupled to the at least one receiver 1102, the at least one transmitter 1104, and the at least one non-transitory computer-readable medium 1106.

Although in FIG. 11, elements such as the at least one receiver 1102, the at least one transmitter 1104, the at least one non-transitory computer-readable medium 1106, and the at least one processor 1108 are described in the singular, the plural is contemplated unless limitation to the singular is explicitly stated. In some embodiments of the present application, the at least one receiver 1102 and the at least one transmitter 1104 are combined into a single device, such as a transceiver. In certain embodiments of the present application, the apparatus 1100 may further include an input device, a memory, and/or other components.

In some embodiments of the present application, the at least one non-transitory computer-readable medium 1106 may have stored thereon computer-executable instructions which are programmed to implement the operations of the methods, for example as described in view of any of FIGS. 2-10, with the at least one receiver 1102, the at least one transmitter 1104, and the at least one processor 1108.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A user equipment (UE) for wireless communication, comprising:
   at least one memory; and
   at least one processor coupled with the at least one memory and configured to cause the UE to:
      receive at least one of positioning reference signal (PRS) configuration information and downlink control information (DCI);
      generate sidelink control information (SCI) based on the at least one of the PRS configuration information and the DCI,
         wherein the SCI indicates a resource in at least one of a time domain and a frequency domain, and
         wherein the resource is for transmitting a sidelink-positioning reference signal (SL-PRS); and
      transmit the SCI,
         wherein the PRS configuration information, the DCI, or the SCI includes one or more fields, and
         wherein the one or more fields are associated with the SL-PRS and include a pattern index value of a PRS pattern of the SL-PRS.

2. The UE of claim 1, wherein the one or more fields within the PRS configuration information, the DCI, or the SCI further include:
   a comb value of the PRS pattern;
   a resource element (RE) offset value set of the PRS pattern;
   a frequency domain offset value of the PRS pattern;
   a total number of one or more symbols of the SL-PRS; or
   a start symbol of the SL-PRS in the time domain.

3. The UE of claim 1, wherein the PRS configuration information includes:
   information relating to one or more available resources in a resource pool.

4. The UE of claim 3, wherein the information relating to the one or more available resources includes at least one of:
   a sub-channel index value regarding each of the one or more available resources;
   a sub-channel index indication in a bitmap manner regarding each of the one or more available resources and one or more non-available resources in the resource pool;
   a resource block (RB) index value regarding each of the one or more available resources;
   an RB index indication in a bitmap manner regarding each of the one or more available resources and one or more non-available resources in the resource pool;
   a timeslot index value regarding each of the one or more available resources; and
   a timeslot index indication in a bitmap manner regarding each of the one or more available resources and one or more non-available resources in the resource pool.

5. The UE of claim 1, wherein the SCI is transmitted on at least one of:
   a physical sidelink control channel (PSCCH) transmission; and
   a physical sidelink shared channel (PSSCH) transmission.

6. The UE of claim 5, wherein the at least one processor is further configured to cause the UE to:
   determine a total number of the PSCCH transmission, or a first total sub-channel number of the PSCCH transmission, or a second total sub-channel number of the PSCCH transmission and the PSSCH transmission; and
   in response to one of the total number and the first total sub-channel number and the second total sub-channel number being larger than one, repeatedly transmit at least one of the PSCCH transmission and the PSSCH transmission.

7. The UE of claim 6, wherein the total number is determined based on at least one of:
   a total number of one or more sub-channels of the SL-PRS; and
   a comb value of a PRS pattern of the SL-PRS.

8. A base station (BS) for wireless communication, comprising:
   at least one memory; and
   at least one processor coupled with the at least one memory and configured to cause the BS to:
      transmit at least one of positioning reference signal (PRS) configuration information and downlink control information (DCI), including a total number of physical sidelink control channel (PSCCH) transmissions, a first total sub-channel number of the PSCCH transmissions, or a second total sub-channel number of the PSCCH transmissions and physical sidelink shared channel (PSSCH) transmissions; and
      receive information associated with a relative geographical position between two or more user equipments (UEs).

9. The BS of claim 8, wherein at least one of the PRS configuration information and the DCI includes one or more fields, and wherein the one or more fields are associated with a sidelink-positioning reference signal (SL-PRS).

10. The BS of claim 9, wherein the relative geographical position between the two or more UEs is measured based on the SL-PRS.

11. The BS of claim 9, wherein the one or more fields further include:

a comb value of the PRS pattern;

a resource element (RE) offset value set of the PRS pattern;

a frequency domain offset value of the PRS pattern;

a total number of one or more symbols of the SL-PRS; or a start symbol of the SL-PRS in the time domain.

12. The BS of claim 8, wherein the PRS configuration information includes:

information relating to one or more available resources in a resource pool.

13. The BS of claim 12, wherein the information relating to the one or more available resources include at least one of:

a sub-channel index value regarding each of the one or more available resources;

a sub-channel index indication in a bitmap manner regarding each of the one or more available resources and one or more non-available resources in the resource pool;

a resource block (RB) index value regarding each of the one or more available resources;

an RB index indication in a bitmap manner regarding each of the one or more available resources and one or more non-available resources in the resource pool;

a timeslot index value regarding each of the one or more available resources; and a timeslot index indication in a bitmap manner regarding each of the one or more available resources and one or more non-available resources in the resource pool.

14. A processor for wireless communication, comprising:

at least one controller coupled with at least one memory and configured to cause the processor to:

receive at least one of positioning reference signal (PRS) configuration information and downlink control information (DCI);

generate sidelink control information (SCI) based on the at least one of the PRS configuration information and the DCI, wherein the SCI indicates a resource in at least one of a time domain and a frequency domain, and wherein the resource is for transmitting a sidelink-positioning reference signal (SL-PRS); and transmit the SCI, wherein the PRS configuration information, the DCI, or the SCI includes one or more fields, and wherein the one or more fields are associated with the SL-PRS and include a pattern index value of a PRS pattern of the SL-PRS.

15. The processor of claim 14, wherein the PRS configuration information includes information relating to one or more available resources in a resource pool.

16. The processor of claim 14, wherein the SCI is transmitted on at least one of:

a physical sidelink control channel (PSCCH) transmission; and a physical sidelink shared channel (PSSCH) transmission.

17. A method performed by a user equipment (UE), the method comprising:

receiving at least one of positioning reference signal (PRS) configuration information and downlink control information (DCI);

generating sidelink control information (SCI) based on the at least one of the PRS configuration information and the DCI, wherein the SCI indicates a resource in at least one of a time domain and a frequency domain, and wherein the resource is for transmitting a sidelink-positioning reference signal (SL-PRS); and transmitting the SCI, wherein the PRS configuration information, the DCI, or the SCI includes one or more fields, and wherein the one or more fields are associated with the SL-PRS and include a pattern index value of a PRS pattern of the SL-PRS.

18. The method of claim 17, wherein the one or more fields within the at least one of the PRS configuration information, the DCI, and the SCI include at least one of:

a comb value of the PRS pattern;

a resource element (RE) offset value set of the PRS pattern;

a frequency domain offset value of the PRS pattern;

a total number of one or more symbols of the SL-PRS; and a start symbol of the SL-PRS in the time domain.

19. The method of claim 17, wherein the PRS configuration information includes:

information relating to one or more available resources in a resource pool.

20. The method of claim 17, wherein the SCI is transmitted on at least one of:

a physical sidelink control channel (PSCCH) transmission; and a physical sidelink shared channel (PSSCH) transmission.

21. The method of claim 20, further comprising:

determining a total number of the PSCCH transmission, or a first total sub-channel number of the PSCCH transmission, or a second total sub-channel number of the PSCCH transmission and the PSSCH transmission; and in response to one of the total number and the first total sub-channel number and the second total sub-channel number being larger than one, repeatedly transmitting at least one of the PSCCH transmission and the PSSCH transmission.

\* \* \* \* \*